United States Patent Office 3,111,458
Patented Nov. 19, 1963

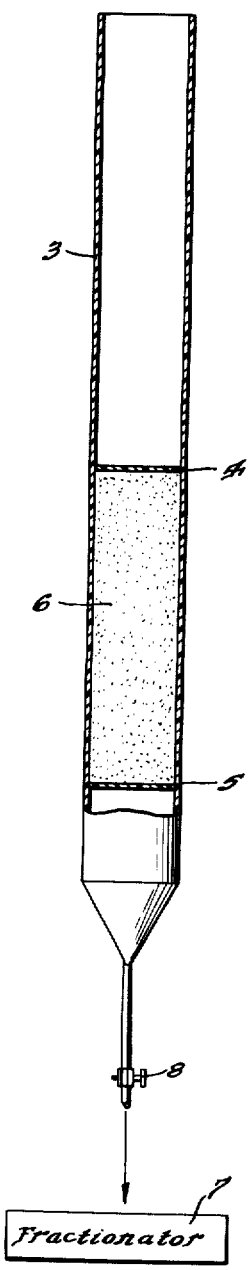
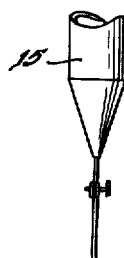
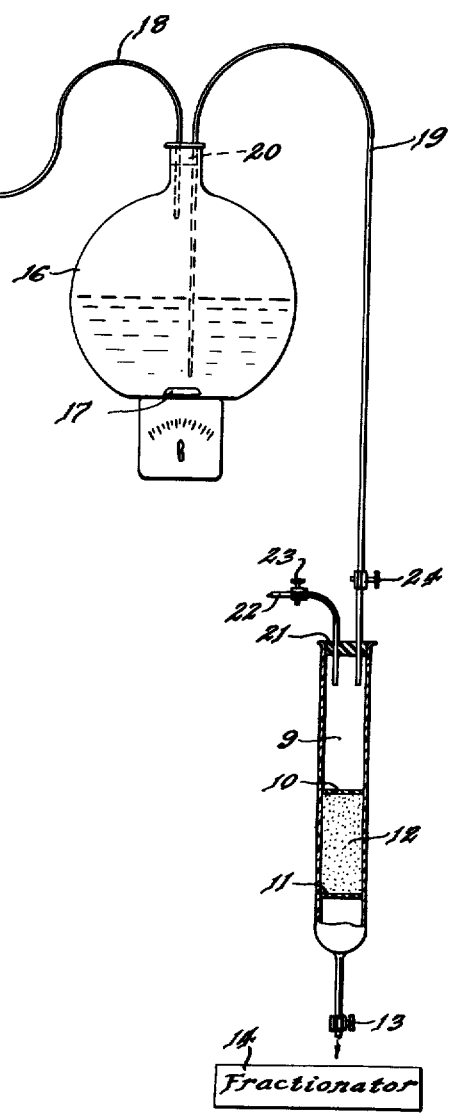

3,111,458
ERYTHROPOIETIC FACTOR PURIFICATION
AND PRODUCT
Wilfrid F. White, Lombard, and Eugene Goldwasser and Gotthard F. Weber, Chicago, Ill., Richard Egan, Bound Brook, N.J., and Robert J. Schlueter, Chicago, Ill., assignors to the United States of America as represented by the United States Atomic Energy Commission
Filed Feb. 16, 1959, Ser. No. 793,651
2 Claims. (Cl. 167—74)

This invention relates to the purification of erythropoietic factor solutions containing foreign material including antigens and anaphylactins. More particularly this invention relates to a method of further purifying an active extract of blood plasma erythopoietic factor such as that obtained by contact with ion exchange materials as set forth in the copending application of Wilfrid F. White and Gotthard F. Weber, Serial No. 741,471, filed June 12, 1958.

The existence of a blood plasma erythropoietic factor that is stimulatory to erythropoiesis in animals, including man, is well established. The presence, for example, of such a factor in the blood of human subjects affected with Cooley's anemia and sickle-cell anemia has been demonstrated by introducing into laboratory animals blood serum obtained from these subjects. The serum was found to produce a measurable augmentation in peripheral red cell, hemoglobin and recticulocyte levels of the test animals although not enough to be practical as a therapeutic agent. A similar result was obtained with blood serum from patients having polycythemia vera. Further substantiation of a plasma erythropoietic factor has been evidenced in extensive studies employing plasma of animals with induced anemia.

The presence of this substance in the plasma of anemic and polycythemic subjects has spurred investigation into the possibility of isolating or concentrating it so as to make it practical for treatment of blood dyscrasias in animals, such as the red blood cell deficiency of radiation sickness which results from excessive radiation from nuclear reactors, or from other nuclear devices including nuclear weapons.

In the application Serial No. 741,471 above referred to, a method is disclosed whereby the erythropoietic factor may be concentrated to a degree exceeding that achieved by previously known methods. Briefly summarized, the method in said application Serial No. 741,471 comprises the treatment of animals, such as sheep, with a hemolytic agent such as phenylhydrazine hydrochloride to produce an artificial anemia or with a polycythemic agent such as cobalt chloride to produce an artificial polycythemia in the animal. Of the two agents mentioned, phenylhydrazine hydrochloride is preferred. The phenylhydrazine hydrochloride is administered to animals such as sheep in a treatment of several doses in an aqueous solution of 18 grams per liter. Since it has been found that there exists a logarithmic relationship which is positive between erythropoietic potency and the degree of anemia, or negative between the factor and the red blood cell level, it is advisable to keep a record of this level while the treatment is in progress in order to regulate the amounts administered. This can be done conveniently by means of hematocrit centrifuge, a device that separates the clear plasma of the blood from the red cell portion by centrifugation and which has a scale in which the red blood cell portion may be read in terms of percent of the whole. Thus the erythropoietic potency rises as the hematocrit reading or value falls, remarkably so as the hematocrit value approaches 10 percent. The hematocrit value for each sheep may be determined prior to the first dosage and ordinarily a second determination is made after all the sheep have received two doses of the solution described; ordinarily this is at the rate of two milliliters for each ten pounds of body weight except for sheep showing subnormal initial hematocrit values in which case the dosage is adjusted to allow for the pre-existing anemia, the first two doses being two days apart on the first and third day of the treatment. After the two doses have been given, the differences, which are quite wide, between the reactivities of individual sheep to the phenylhydrazine hydrochloride begin to show up in the hematocrit readings, and it is advisable to increase or reduce the subsequent dose for those whose hematocrit values are notably high or low. A third dose is given on the fifth day based on the degree of anemia as shown by the hematocrit and on the sixth day the sheep are exsanguinated. Ordinarily after this type of controlled treatment the hematocrit value of pooled plasma groups of about 20 animals is about 10 to 20 percent, and the potency is one unit per milliliter, as compared to about 0.5 unit for pooled plasmas of animals with only their body weights taken into account in determining their dosages. A unit of potency is the increase in the incorporation of radioactive iron brought about by the injection into starved rats of five micromoles of cobaltous chloride. The blood so obtained by exsanguination is treated with an anticoagulant and centrifuged in order to separate the red corpuscles from the plasma. The plasma is then adjusted to a pH in the range from about 3.5 to about 8.5, preferably from about 4.2 to 4.8, and dialyzed against water until the volume ratio becomes about one part plasma to about three parts water; the preferred amount of dialysis brings the salt concentration of the plasma to about .03 to about .04 molar, with optimum results being achieved at a salt concentration of about .0375 molar. Any precipitate formed after this operation is removed by conventional methods, and the dialyzed, pH-adjusted plasma is then brought into contact with an ion exchange material having a preferential adsorption of the erythropoietic factor over foreign protein ingredients present in the plasma. This can be done either in a batch operation or in a column.

Said application Serial No. 741,471 states in detail the ion exchange materials which may be used for the process of the invention of that application, but the preferred material is anion exchange material. Particularly satisfactory materials are the insoluble, open chain, high molecular weight polysaccharides containing anionic exchange groups. Insoluble alkyl amino derivatives of cellulose such as the diethyl amino ethyl ether of cellulose, commonly known as DEAE, and prepared by condensing sodium cellulose with 2-chlorotriethylamine has been found particularly satisfactory. The contact of the dialyzed, pH-adjusted plasma with the ion exchange material under the conditions set forth results in the sorption of the erythropoietic factor by the ion exchange material; when this is complete the factor is eluted from the ion exchange material with a suitably buffered solution with a higher salt concentration than that of the dialyzed, pH-adjusted plasma prior to its contact with the ion exchange material. An example of such an eluting solution is one having sodium chloride concentration from about 0.1 molar to about 0.5 molar and a sodium phosphate concentration of about 0.05 molar to about 0.2 molar. After such elution has proceeded long enough to remove most of the erythropoietic factor from the ion exchange material, as can be determined from optical density measurements with a spectrophotometer, the eluted solution is then dialyzed against water, and finally the water in the resulting dialyzed solution is separated from the solids by the well-known freezing and sublimation process of lyophilization.

The present invention is particularly addressed to a method of further purifying the solid product obtained after the lyophilization process above mentioned, but it can also be used on solutions or concentrates of the erythropoietic factor produced by other methods than that described in application Serial No. 741,471. The desirability for further purification of the product of the method of that application was made apparent by its anaphylactic effect on test animals; whereas the product on being first administered to animals resulted in markedly increased erythropoiesis, thereby establishing its efficacy, subsequent administrations to the same animals produced anaphylactic reactions. Inasmuch as most animals were unharmed by a single dose, it became apparent that while the material produced erythropoiesis on one dosage, some anaphylactic factor was present, the elimination of which was necessary if the factor was to be administered to any individual more than once.

An attempt was made to bring about further purification of the product, including the elimination of the anaphylactic factor mentioned, by running the solution through a DEAE column a second time, but the results of this procedure were disappointing. Apparently nothing was to be gained by repeated contacts with this type of ion exchange material.

Accordingly, the object of the invention is further to purify the product of the method of application Serial No. 741,471 and to eliminate the antigenic factor inherent therein.

Other objects and advantages of the invention will become apparent from the following description and drawings in which FIGURE 1 is a view in elevation, partly in cross section, of the main apparatus used in the first stage of the invention, and FIGURE 2 is a similar view of the main apparatus used in the second stage.

Our invention is based upon the discovery that while the product of the method of application Serial No. 741,471, or any alternate method of making it, cannot be improved by repeated contacts with DEAE so as to cause its sorption, it can be improved by first subjecting it to a reverse of this process, namely, by causing a solution to flow under certain conditions of ionic strength and pH through a column of ion exchange material of opposite type to that of DEAE, whereby the desired factor is not sorbed but passed through while undesirable components are sorbed by the material of the column; thereafter, under other certain conditions of ionic strength and pH, the method of sorption by DEAE, or other similar materials, originally found to be ineffective for further purification, becomes effective, and the desired erythropoietic factor may be selectively removed from the DEAE or other similar ion exchange material by a carefully controlled gradient elution. The eluted solutions are collected in a series of separate portions and checked by solution conductivity and spectrophotometric optical density measurements to determine the effluent fractions to be saved containing the factor. Then by thorough dialysis against water, sodium chloride and other ionic solutes may be removed from the solution to produce a salt-free, non-antigenic, non-anaphylactic, strongly erythropoietic material suitable for use in the treatment of animals for conditions involving a deficiency of red blood corpuscles. Such conditions include not only natural diseases such as anemias, but also induced deficiencies such as those caused by excessive radiation, accidental loss of blood, and the like.

While the invention relates to a unitary process, for convenience it will be described as consisting of two stages, the first stage comprising various component steps previous to, during, and immediately subsequent to the passing of the solution through the first column referred to, and the second stage comprising various steps previous to, during, and subsequent to the sorption of the erythropoietic factor by the ion exchange material in the second column referred to and its removal therefrom by the method of gradient elution. The first stage could be carried out batch-wise although the column method is preferred; the second stage, due to the need for selective removal by the gradient elution, can only be carried out in a column if a great multiplicity of batch mixings and decantations are to be avoided.

Referring to FIGURE 1 reference numeral 3 designates a glass or plastic column for carrying out the first stage of the invention, in which porous plastic plates 4 and 5 hold in place ion exchange material 6, the flow from the bottom of the column into fractionator 7 being controlled by stopcock 8.

FIGURE 2 shows the main apparatus for carrying out the second stage of the invention comprising column 9 with porous plates 10 and 11 for holding in place ion exchange material 12, and stopcock 13 for regulating the flow into fractionator 14. The elution-feeding part of the apparatus consists of upper vessel, or reservoir, 15, and lower vessel, or mixing chamber, 16, in which there is a magnetic stirrer 17. The reservoir is connected to the mixing chamber by tube 18 and tube 19 conducts the mixed elution fluid from the mixing chamber into column 9, the flow being regulated by stopcock 24. Rubber corks 20 and 21 keep the entire apparatus air-tight and at superatmospheric pressure due to the level of the liquid in reservoir 15. Bleeding tube 22 and stopcock 23 permit bleeding off of air at the top of column 9 at the start of the elution, or whenever air bubbles accumulate during the process.

In order to prepare the column 3 for carrying out the first stage of the invention, a suitable ion exchange resin 6 is selected. Any type of cation exchange material may be used which is mildly acidic after being equilibrated by a solution of excess hydrogen ions, a resin having as its acidic functions carboxylic acid radicals being preferred. Strongly acidic exchange materials are to be avoided because of their destructive effect on protein and protein-like materials, but any mildly acidic cation exchange material comparable to one whose acidic character is due to carboxylic radicals may be used. The type of skeleton of the exchange material may vary widely; it may be cellulosic, acrylic, methacrylic, or other substituted acrylic polymers, a phenol, resorcinol, ortho-cresol, para-cresol, or other phenolic condensation product with formaldehyde or some other aldehyde, vinyl, divinyl, derived from vinylidene or a vinyl-vinylidene copolymer, or any structure that does not interfere with the cation exchange ability and mild acidity required. We have found to be suitable the resins Amberlite IRC–50 and Amberlite XE–97, which are ion exchange materials of different particle sizes derived from a substituted acrylic copolymer with an allyl compound condensation product having carboxylic functional groups, the structure of which is set forth in United States Patent No. 2,346,111. Amberlite XE–97 which is of finer particle size than Amberlite IRC–50 is preferred. Cation exchange resins ordinarily come from the manufacturer in their acidic condition; before use they should preferably be buffered by a solution of about 0.15 to 0.20 molar sodium chloride and about 0.02 molar sodium phosphate, a molarity of 0.18 sodium chloride resulting in a total sodium ion concentration due to salts of 0.2 being preferred. The hydrogen ion concentration in this stage is not critical and may be left as high as the mildly acidic ion exchange material would make it without any adjustment; however, adding sufficient sodium hydroxide to raise the pH to about 6 is preferred. Other bases could, of course, be use for this purpose but it is preferred to keep all the positive metallic ions sodium ions rather than to have a mixture with consequent "salting in" effect. The equilibration could be done batch-wise but we prefer to do it in situ at 6 in the column 3, allowing the buffering solution to flow out at a rate adjusted by the stopcock 8.

After the equilibration has been completed, the product to be purified is dissolved in water to make a solution of about 10% and is then carefully introduced on the top of the column in order to prevent mixing and insure its even flow in chromatographic fashion down the column. The strength of this solution is not critical; the process appears to be reasonably successful even when the solution approaches full saturation, but it becomes more efficient with dilution, the upper limit of dilution being determined only by the practical difficulties of handling large volumes. The preferred 10% concentration renders the process quite efficient while still avoiding the practical difficulties mentioned. Of course, if the final step of dehydration by lyophilization is omitted in the process set forth in application Serial No. 741,471, the undehydrated solution of that process could be used, but unless the first stage of the present invention can follow very promptly, it is better to lyophilize in order to prevent denaturization of the material which is less stable in the hydrated state then when dehydrated.

After the solution containing the erythropoietic factor is added to the column, the chromatographic effect causes it to flow down the column in a phase segregated from the equilibration solution absorbed by the ion exchange material, which solution comes out first into the vessel and may be discarded. The point where the drainage of the equilibration solution is complete and that of the valuable solution under process begins may be determined by taking frequent optical density measurements of fractions of the draining liquid; a convenient practical arrangement for doing this is for the vessel to be a "fractionator", which is an apparatus which automatically moves small glass vessels, about the size of ordinary test tubes, underneath the stopcock 8 from time to time in series fashion after which they may be fed either manually or automatically into a spectrophotometer which measures the optical density. The preferred method of measurement is at an electromagnetic wave length of 280 millimicrons, at which wave length most protein and protein-like substances cause a sharp increase in optical density. However other wave lengths, such as 260 millimicrons sensitive to biochemical compounds, may be used, or a ratio between two such wave lengths, as is known in the art, may be used.

Alternatively, the point where drainage of the equilibration liquid ends and that of the valuable liquid begins may be determined by precisely determining the amount of "hold-up water" which the particular column is capable of storing, but due to the variance between individual lots of ion exchange material, temperature, and the like, determination by spectrophotometric optical density methods is preferred.

Since the "hold-up", or storing ability, of the column may be great enough to retain some or all of the valuable liquid, an additional portion of the equilibration liquid may be introduced at the top of the column after the valuable liquid has completely subsided into the ion exchange material so that, again, due to the chromatographic effect, the additional portion in a segregated phase will act piston-like to push the valuable liquid down through the column. The point where the drainage of the valuable liquid ends at the bottom of the column and that of the upper or piston-like equilibration solution begins, may be determined in the manner above set forth.

The effluent valuable liquid is ordinarily clear, but should there be any cloudiness from fine material in the ion exchange material or elsewhere, the solid matter may be removed by centrifugation as is well-known in the art. The first stage is complete at this point.

The type of second stage ion exchange material 12 suitable for use in column 9 of FIGURE 2 is similar to that used in the method of application Serial No. 741,471, and it is of an anion exchange type. Any anion exchange material which is very mildly basic when it has been equilibrated against a basic equilibration liquid is suitable, but strongly basic materials are to be avoided due to their destructive action on biochemical compounds. Examples of suitable materials are the diethyl amino ethyl ether of cellulose known as DEAE above described and the dimethyl amino ethyl ether of cellulose, the first named DEAE being preferred. It is believed that other weakly basic anion exchangers may be used such as Amberlite IR–4b described in Example 8 of Estes Patent No. 2,356,151. The material is packed into the column so as to create a flow rate of about 25 cc. per minute after it has been equilibrated. Equilibration should be carried out overnight with a buffer solution of about .0375 molar sodium chloride; this concentration is quite critical and any substantial departure therefrom in either direction destroys the selective action of the process of this stage.

The solution resulting from stage one is adjusted to an ionic strength of .0375 by dialysis against water in the cold, and is then carefully placed on the top of column 9 and permitted to flow therein; the amount of solution should, of course, not exceed the holding or storage capacity of the material of the column since in this stage it is desired to sorb the entire erythropoietic factor by the material of the column.

After the solution has completely subsided into the ion exchange material of the column, the selective gradient elution is applied, the apparatus for carrying out this elution being shown in detail in FIGURE 2.

Prior to the elution, the mixing chamber 16 is approximately half filled with a solution of .0375 molar sodium chloride identical with the equilibration buffer solution. In the reservoir 15 is placed a solution of greater molarity in sodium chloride than that in the mixing chamber, a molarity of 0.4 being preferred. As the level in the reservoir sinks, it should be from time to time raised by additional portions of the solution of higher molarity.

The solution from the reservoir is permitted to flow into the mixing chamber, where, due to the action of the stirrer 17, it becomes mixed with the solution of lesser molarity originally in the mixing chamber, with the result that the ion exchange material becomes bathed with a slowly flowing solution of ever increasing molarity with respect to sodium chloride. Due to this change, very selective elutions take place from the ion exchange material due to the small, but sharply defined differences in solubilities of proteins and protein-like materials, and which we have discovered in this invention, is also characteristic of the erythropoietic factor. Whether this is due to the fact that the factor is itself a protein or protein-like substance, or whether it is a substance closely associated with a protein, as by complexing or chelation, is not certain; however, we do not wish to be bound by any particular theory explaining the operation of our invention; the fact is that we have discovered the gradient elution to be highly effective in purifying the erythropoietic factor.

As in stage one, the effluent liquid from the column should be caught in a vessel and manually measured for conductivity and optical density or gathered in a fractionator as above explained with respect to the first stage. When the effluent solution reaches approximately .07 molarity in sodium chloride there will be a sharp increase in optical density rising to nested peaks at both 280 millimicrons and 260 millimicrons; the liquid flowing from the column while these peaks of optical density are evident is collected as it contains the final purified erythropoietic factor with the antigenic factor or factors eliminated, and the remainder of the effluent from the column may be discarded. This selective collection is most conveniently carried out with a fractionator 14 in FIGURE 2.

While it might be possible to so standardize the ion exchange material and conditions of ambient temperature and pressure that the gradient method of elution would be unnecessary, we believe that this will never prove to be practical and that the gradient method which selectively elutes the desired factor at slightly varying conditions of molarity and temperature from batch to batch will always be preferred.

The peak at 280 millimicrons of optical density mentioned usually first shows itself when the molarity of the gradient elution solution reaches 0.07 or thereabouts, and the fractions collected while this peak is in evidence are poured together and thoroughly dialyzed against water until the conductivity of the solution is reduced to a value at or close to that of pure water. The solution is then dehydrated by lyophilization and the resulting cream colored powder is the purified concentrate containing the erythropoietic factor. The beginning of the peak at 280 millimicrons is when the optical density rises sharply from about 0.1 to about 1.2, and the peak continues until the optical density recedes to about 0.5 at the same wave length.

EXAMPLE

A Pyrex glass column 6" in diameter with two porous plates to hold the ion exchange material in place was filled with ion exchange material to a height of 80 cm. The ion exchange material, Amberlite XE-97, was equilibrated with .18 molar sodium chloride and .02 molar sodium phosphate, and toward the end of the equilibration, brought to a pH of 6 by the addition of a small amount of sodium hydroxide, after which a large excess of the equilibration solution was passed through it. Nineteen grams of the lyophilized product of Example I of application Serial No. 741,471, in which the product was made with the use of DEAE cellulose, were dissolved in 192 cc. of water and then carefully introduced to the top of the column and permitted to flow into it. The effluent liquid from the column was caught in a mechanical fractionator and the conductivities and optical densities of the fractions measured in a conductivity measuring apparatus and a spectrophotometer using 280 millimicrons wave length. After about 7 liters of liquid had flowed out of the bottom of the column, a sharp rise of optical density was noted, after which the next four liters coming through the column were collected, or until the optical density readings at 280 millimicrons subsided to a value of 0.5; during this time additional buffer solution was added to the top of the column until this collection was complete. The liquid so collected was set aside for further treatment in the second stage.

A Pyrex glass column 7.6 cm. in diameter with two perforated plastic plates for holding the ion exchange material in place was filled to the height of 15 cm. with DEAE cellulose packed to give a flow rate of 25 cc. per minute. The material was equilibrated with a buffer solution of .0375 molar sodium chloride overnight. Above the column there was arranged a gradient elution apparatus consisting of an upper reservoir, a lower mixing chamber containing a magnetic stirrer and connecting tubes, the mixing chamber being at superatmospheric pressure due to air-tight connections with the tubes and the liquid level in the upper reservoir. The initial starting solution in the mixing chamber was .0375 molar in sodium chloride and the solution in the upper reservoir was .4 molar sodium chloride, additional portions of which solution were added by hand to the upper reservoir during the elution from time to time.

The solution resulting from the first stage was dialyzed against pure water until it attained sodium chloride molarity of .0375 as determined by conductivity measurements; this dialyzed solution was then carefully placed on top of the column and permitted to settle into the ion exchange material, and the effluent liquid during this period was collected in a vessel beneath the column and discarded.

A gradient elution of the material in the column was then begun by permitting the solution in the reservoir to slowly flow into the mixing chamber with the stirrer turned on. A mechanical fractionator was placed beneath the column to collect the effluent liquid and the fractions were measured for conductivity in a conductivity measuring apparatus and for optical density in a spectrophotometer employing 280 millimicrons electromagnetic wave length. At about .07 sodium chloride molarity, a sharp rise in optical density was noted, and the fractions collected during the continuance of this peak of optical density were set apart and poured together in a dialyzing apparatus in which they were dialyzed thoroughly against 50 liters of water which was changed four times until the conductivity fell to almost the value of pure water. The solution was then dehydrated by lyophilization, yielding about 2½ grams of cream colored concentrate.

The said concentrate was assayed by injecting aqueous solutions of a strength of 0.25 mg. per liter into starved Sprague-Dawley rats which are thereafter injected with radioactive iron. Repeated dosages produced no antigenic effects and one day after the final dosage the rats were sacrificed and their blood counted in a radioactivity counter. Since the metabolism of the rats promptly eliminates all iron not taken up by the red blood cells through excretion, and since rats in a starved condition are known to have a markedly decreased rate of red blood cell formation, the take-up of the radioactive iron in excess of this decreased rate was directly proportional to the erythropoietic activity of the concentrate with which they were treated. The concentrate's erythropoietic activity was therefore almost linear with the radioactivity count, and so determined, was found to have a potency of 1 to 10 units per milligram, a unit being, as was explained above, the amount of increase in the incorporation of radioiron brought about by the injection of 5 micromoles of cobaltous chloride.

A further assay of the erythropoietic efficacy of the concentrate was made with polycythemic mice which were given 250 micrograms each per day which resulted in a reticulocyte count of 2.0 percent, whereas control mice administered like amounts of salt had a count of 0.0 percent.

In addition to the above assays demonstrating both the erythropoietic activity and absence of the antigenic, or anaphylactic, factor in rats, assays were made with 4 groups of test guinea pigs and control guinea pigs to test the anaphylactic activity of crude blood plasma, of the product of the method of application Serial No. 741,471, and of the products of stage one and stage two of the present invention. Guinea pigs were used for these tests since it is well known that they have reactions to anaphylactic agents very similar to those of man.

The results of these tests are set forth in tabular form as follows:

*Table I.—Guinea Pig Anaphylactic Test*

[700-g. male animals used]

CRUDE PLASMA FROM ANEMIC SHEEP

| Guinea Pig No. | Response | | | | | Remarks |
|---|---|---|---|---|---|---|
| | Excitement | Cough | Bronchospasm | Collapse | Death | |
| 1 | v | v | v | v | v | Died in 5 minutes. |
| 2 | v | v | v | v | v | Do. |
| 3 | v | v | v | v | v | Do. |
| 4 | v | v | v | v | v | Do. |
| 5 | v | v | v | v | v | Do. |
| 6 | v | v | v | v | | Sacrificed, 24 hours. |
| Controls | | | | | | |
| 1 | | | | | | No effect. |
| 2 | | | | | | Do. |

*Table II.—Product of Application Serial No. 741,471*

| Guinea Pig No. | Response | | | | | Remarks |
|---|---|---|---|---|---|---|
| | Excitement | Cough | Bronchospasm | Collapse | Death | |
| 1 | v | v | v | v | v | Died in 5 minutes. |
| 2 | v | v | v | v | v | Do. |
| 3 | v | v | v | v | v | Do. |
| 4 | v | | | | | Sacrificed, 24 hours. |
| 5 | v | v | v | | | Do. |
| 6 | v | v | v | v | v | Died in 5 minutes. |
| Controls | | | | | | |
| 1 | | | | | | No effect. |
| 2 | | | | | | Do. |

*Table III.—Sample: Stage 1 Material*

| Guinea Pig No. | Response | | | | | Remarks |
|---|---|---|---|---|---|---|
| | Excitement | Cough | Bronchospasm | Collapse | Death | |
| 1 | | | | | | No effect. |
| 2 | v | v | v | v | v | |
| 3 | v | v | v | v | v | |
| 4 | v | v | v | v | v | |
| 5 | v | v | v | v | v | |
| Controls | | | | | | |
| 1 | | | | | | No effect. |
| 2 | | | | | | Do. |

*Table IV.—Guinea Pig Anaphylactic Test*

[300-g. male animals used]

SAMPLE: STAGE 2 MATERIAL

| Guinea Pig No. | Response | | | | | Remarks |
|---|---|---|---|---|---|---|
| | Excitement | Cough | Bronchospasm | Collapse | Death | |
| 1 | v | v | | | | No effect. |
| 2 | | | | | | Do. |
| 3 | | | | | | |
| 4 | v | v | v | | | |
| 5 | v | v | | | | |
| Controls | | | | | | |
| 1 | | | | | | No effect. |
| 2 | | | | | | Do. |

From the foregoing tables it can readily be seen that the crude plasma of anemic sheep was highly antigenic, causing death of 5 out of 6 guinea pigs within five minutes. The product of the method of application Serial No. 741,471 appear to show some improvement with respect to antigenicity, but the great improvement brought about by the use of the product of application Serial No. 741,471 treated in accordance wtih the teachings of the present invention, is evident in that 2 guinea pigs showed no effects whatever, 1 showed bronchospasm and the remaining 2 only coughs and excitement.

In summary a Table V is submitted showing weight yield in grams, erythropoietic potency in "units" per milligram, total activity in "units" and overall recovery in percent. Stage zero refers to the preparation of the concentrate set forth in application Serial No. 741,471, and stages one and two are those of this application.

Table V.—Example of Three-Step Process

| Stage | Description | Weight Yield (g.) | Potency (u./mg.) | Total Activity (units) | Overall Recovery (percent) |
|---|---|---|---|---|---|
| 0 | Plasma | 640 | 0.0071 | 4,560 | 100.0 |
| | First DEAE eluate. | 2.85 | 1.0 | 2,850 | 63.0 |
| 1 | XE-97 effluent | 1.43 | 1.55 | 2,230 | 49.0 |
| 2 | 2nd DEAE eluate. | 0.46 | 2.23 | 1,030 | 22.5 |

The final product of the second stage of the method of the invention is effective in producing erythropoiesis in animals without anaphylactic effects in shiftable dosages.

We claim:

1. A method of producing a blood plasma erythropoietic factor-containing product, comprising feeding a hemolytic agent to animals in an amount sufficient to produce severe anemia, withdrawing blood from the animals and centrifuging it to separate the plasma from the red cell portion, dialyzing the plasma and then bringing it into contact with an anion exchange resin, then eluting the anion exchange resin with an aqueous solution of about 0.1 to 0.5 M sodium chloride and about 0.05 to 0.2 M sodium phosphate; then bringing the eluate into contact with a cation exchange resin which has previously been equilibrated to about 0.15 to 0.20 molarity with respect to sodium chloride and about 0.02 molarity with respect to sodium phosphate; collecting the solution resulting from the contact with the cation exchange resin; then bringing the resulting solution into contact with an anion exchange resin which has previously been equilibrated to about .0375 molarity with respect to sodium chloride, and then removing the factor from the anion exchange resin by a fraction-selective gradient elution solution created over a period of time by introducing into and intermixing with a mixing chamber solution of about 0.0375 molar in sodium chloride a reservoir solution of more than about 0.0375 molar in sodium chloride to about 0.4 molar in sodium chloride, and withdrawing the resulting intermixed while said introduction is taking place, the said elution having a flow rate of about 25 cc. per minute and continuing until the effluent liquid from the anion exchange resin shows a marked decrease in optical density measured spectrophotometrically following a marked increase of such optical density when the sodium chloride molarity of the intermixed solution is about 0.07, the portion of the effluent liquid from the anion exchange resin between said increase and said decrease being the purified erythropoietic factor-containing product.

2. A method of removing impurities from an eluate from an anion exchange resin, the said eluate containing the blood plasma erythropoietic factor, comprising equilibrating a mildly acidic cation exchange resin having carboxylic functional groups, with an aqueous solution of about 0.15 to 0.20 molar sodium chloride and about 0.02 molar sodium phosphate, the said solution having a pH of about 6, bringing the eluate into contact with the cation exchange resin so equilibrated, thereby sorbing some of the impurities in the eluate but not sorbing the factor, removing the eluate so partially purified from the cation exchange resin, equilibrating a mildly basic anion exchange resin with an aqueous solution of about .0375 molar sodium chloride, bringing the partially purified eluate into contact with the anion exchange resin to equilibrated thereby sorbing the factor upon it, and removing the factor substantially free of impurities from the anion exchange resin by a fraction-selective gradient elution created over a period of time by introducing into and intermixing with a mixing chamber solution of 0.0375 molar sodium chloride a reservoir solution of about 0.4 molar sodium chloride, measuring the effluent liquid of the gradient elution spectrophotometrically for optical density, and collecting the fraction first showing increased optical density while the sodium chloride molarity of the effluent liquid is about 0.07.

References Cited in the file of this patent

PSEBM, 98:3, July 1958, pp. 602–4.
J. Biol. Chem., vol. 230, 1958, pp. 399–408.
JACS. vol. 76, Mar. 20, 1954, pp. 1711–12.
JACS, vol. 77, Feb. 5, 1955, pp. 742–745.
JACS, vol. 78, 1956, pp. 751–763.
Fed. Procs., Part 17, No. 1, March 1958, p. 59.
Rambach: Blood, 12:12, December 1957, pp. 1101–1113.
PSEMB, 96:3, December 1957, pp. 616–618.

UNITED STATES PATENT OFFICE
CERTIFICATE OF CORRECTION

Patent No. 3,111,458                      November 19, 1963

Wilfrid F. White et al.

It is hereby certified that error appears in the above numbered patent requiring correction and that the said Letters Patent should read as corrected below.

Column 5, line 20, for "use" read -- used --; column 11, line 31, for "shiftable" read -- suitable --; column 12, line 5, after "intermixed" insert -- solution --; line 30, for "to" read -- so --.

Signed and sealed this 23rd day of June 1964.

(SEAL)
Attest:

ERNEST W. SWIDER
Attesting Officer

EDWARD J. BRENNER
Commissioner of Patents